United States Patent
Downs

(10) Patent No.: US 6,464,211 B1
(45) Date of Patent: Oct. 15, 2002

(54) DIFFUSER ASSEMBLY

(75) Inventor: Ernest W. Downs, Palm Springs, CA (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/914,666

(22) PCT Filed: Aug. 31, 1999

(86) PCT No.: PCT/US99/19898

§ 371 (c)(1),
(2), (4) Date: Nov. 16, 2001

(87) PCT Pub. No.: WO00/51717

PCT Pub. Date: Sep. 8, 2000

(51) Int. Cl.$^7$ .................................................. B01F 3/04
(52) U.S. Cl. .............................. 261/122.1; 261/DIG. 70
(58) Field of Search ........................... 261/122.1, 122.2, 261/124, DIG. 70; 210/220, 221.1, 221.2

(56) References Cited

U.S. PATENT DOCUMENTS

| | | | |
|---|---|---|---|
| 3,083,953 A | | 4/1963 | Langdon et al. |
| 3,837,629 A | * | 9/1974 | Matras et al. ............ 261/122.1 |
| 3,953,553 A | * | 4/1976 | Thayer .................... 261/122.1 |
| 3,954,922 A | * | 5/1976 | Walker et al. .............. 261/124 |
| 4,046,845 A | * | 9/1977 | Veeder .................... 261/122.1 |
| 4,495,114 A | * | 1/1985 | Strauss ....................... 261/124 |
| 4,818,446 A | | 4/1989 | Schreiber et al. |
| 5,330,688 A | | 7/1994 | Downs |
| 5,863,031 A | * | 1/1999 | Veeder et al. ............ 261/122.1 |
| 5,888,391 A | * | 3/1999 | Meshengisser et al. .. 261/122.1 |
| 6,244,574 B1 | * | 6/2001 | Downs .................... 261/122.1 |
| 6,367,783 B1 | * | 4/2002 | Raftis ..................... 261/122.1 |

* cited by examiner

Primary Examiner—C. Scott Bushey
(74) Attorney, Agent, or Firm—Michael Best & Friedrich LLP

(57) ABSTRACT

The diffuser assembly of the present invention includes first and second diffuser bodies in fluid communication with an air distribution pipe. The diffuser assembly further includes a saddle that supports the first diffuser body and the second diffuser body. The saddle is connected to the distribution pipe by a hollow core rivet. Gas is forced from the distribution pipe through the hollow core rivet where the gas passes into the first and second diffuser bodies. The gas exits the first diffuser body through a first diffusion media and exits the second diffuser body through a second diffusion media. The first and second diffusion media form the gas into fine bubbles that serve to facilitate aeration of a fluid.

26 Claims, 7 Drawing Sheets

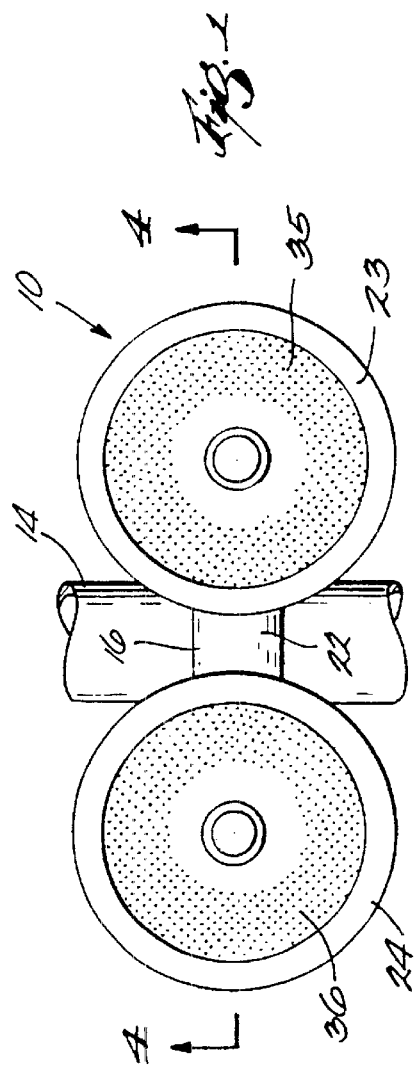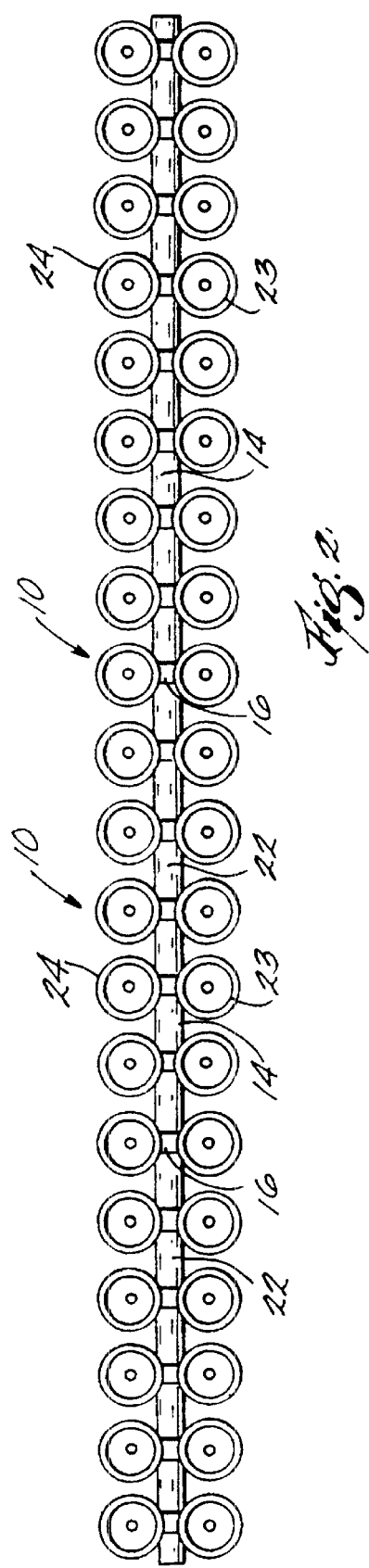

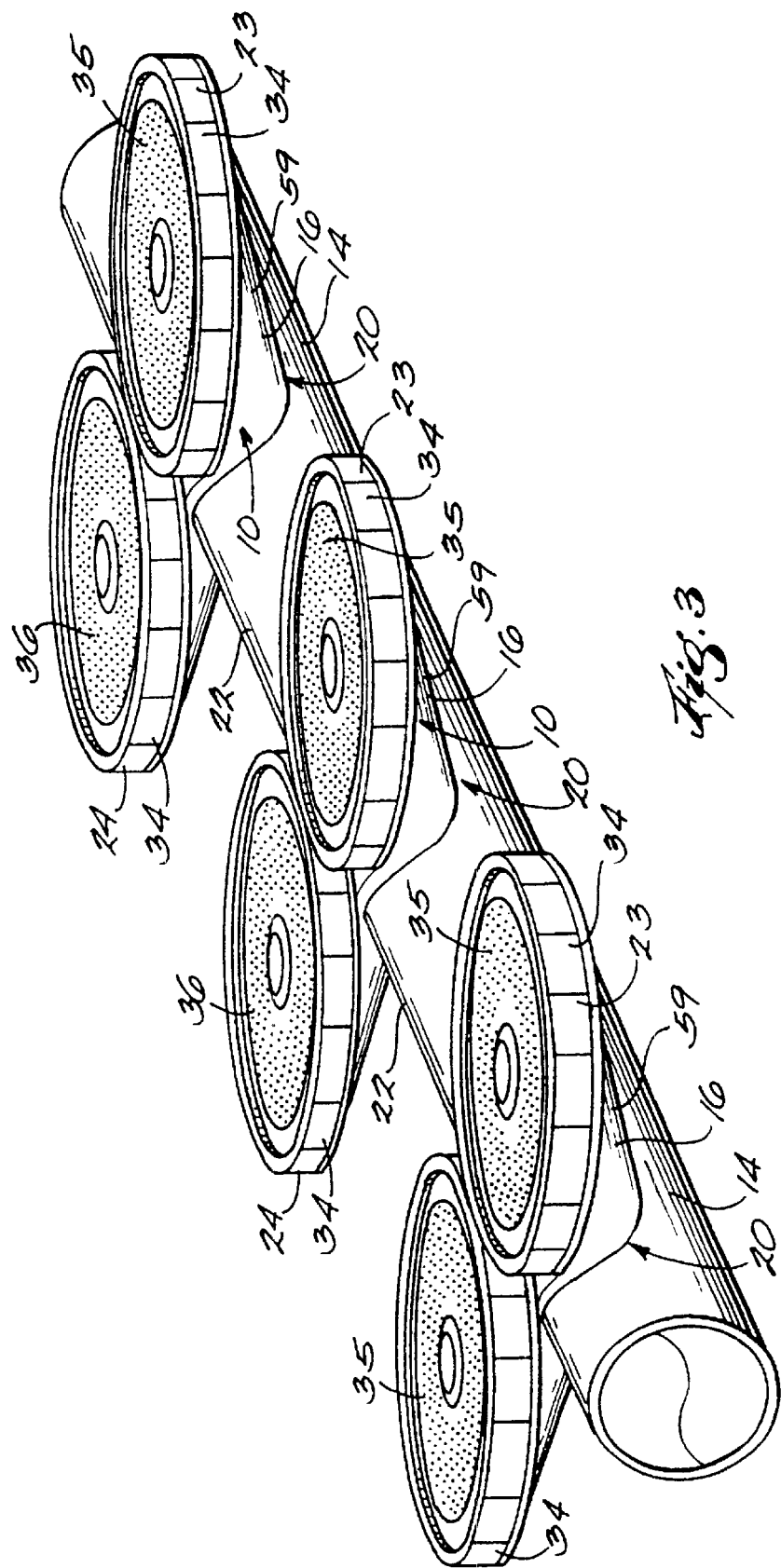

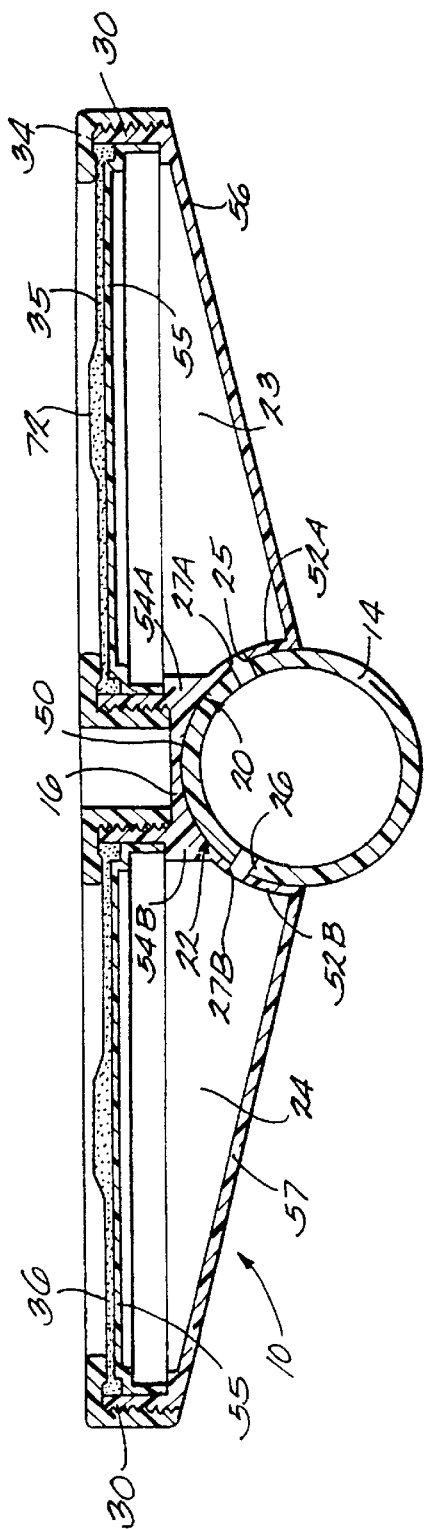
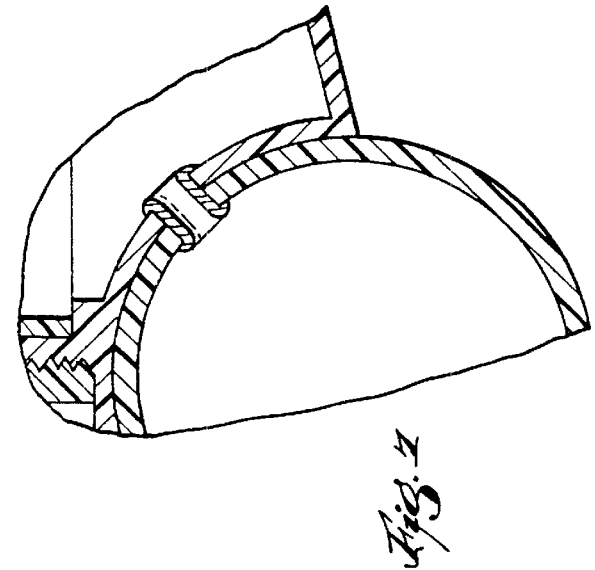

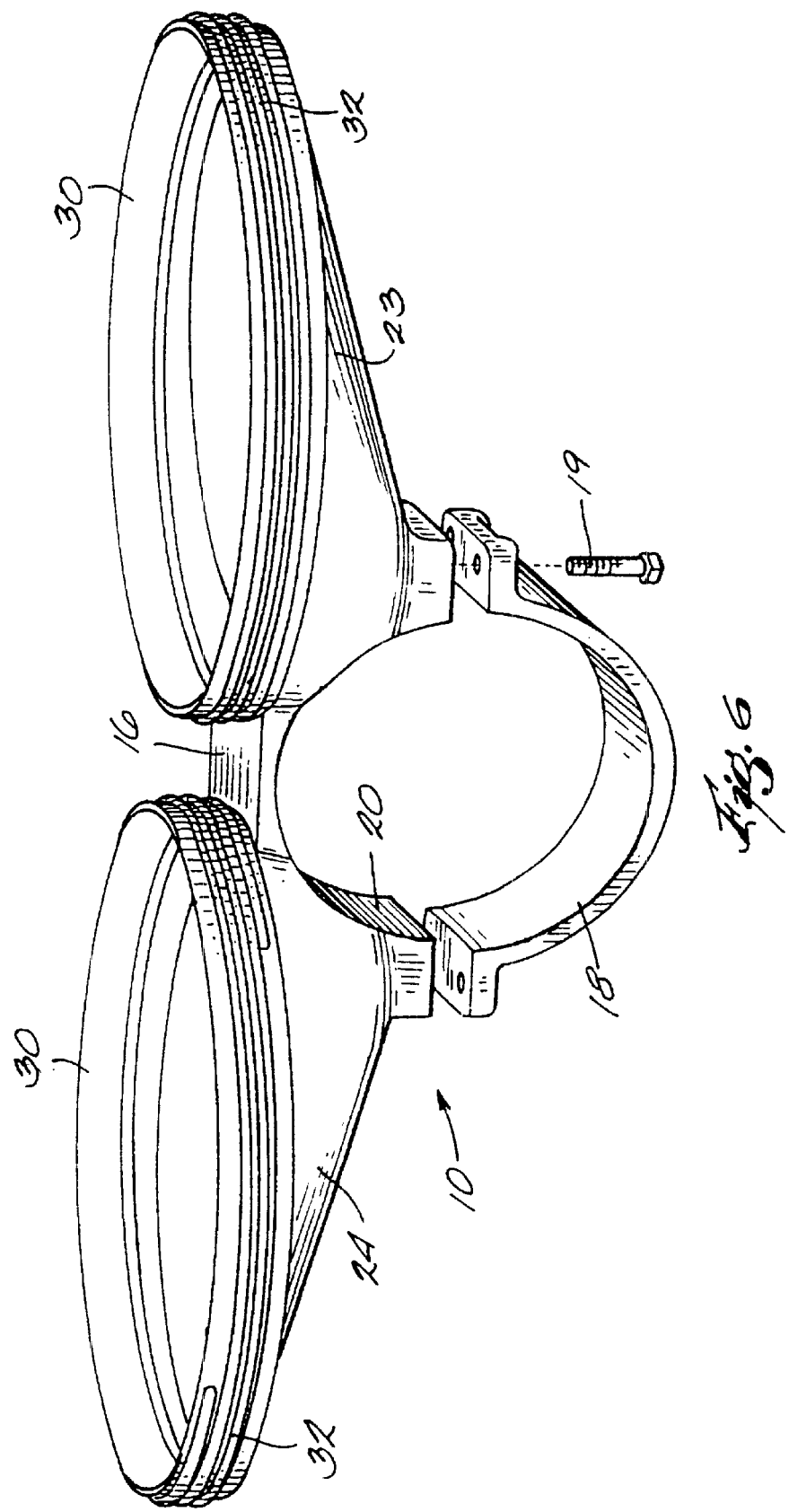

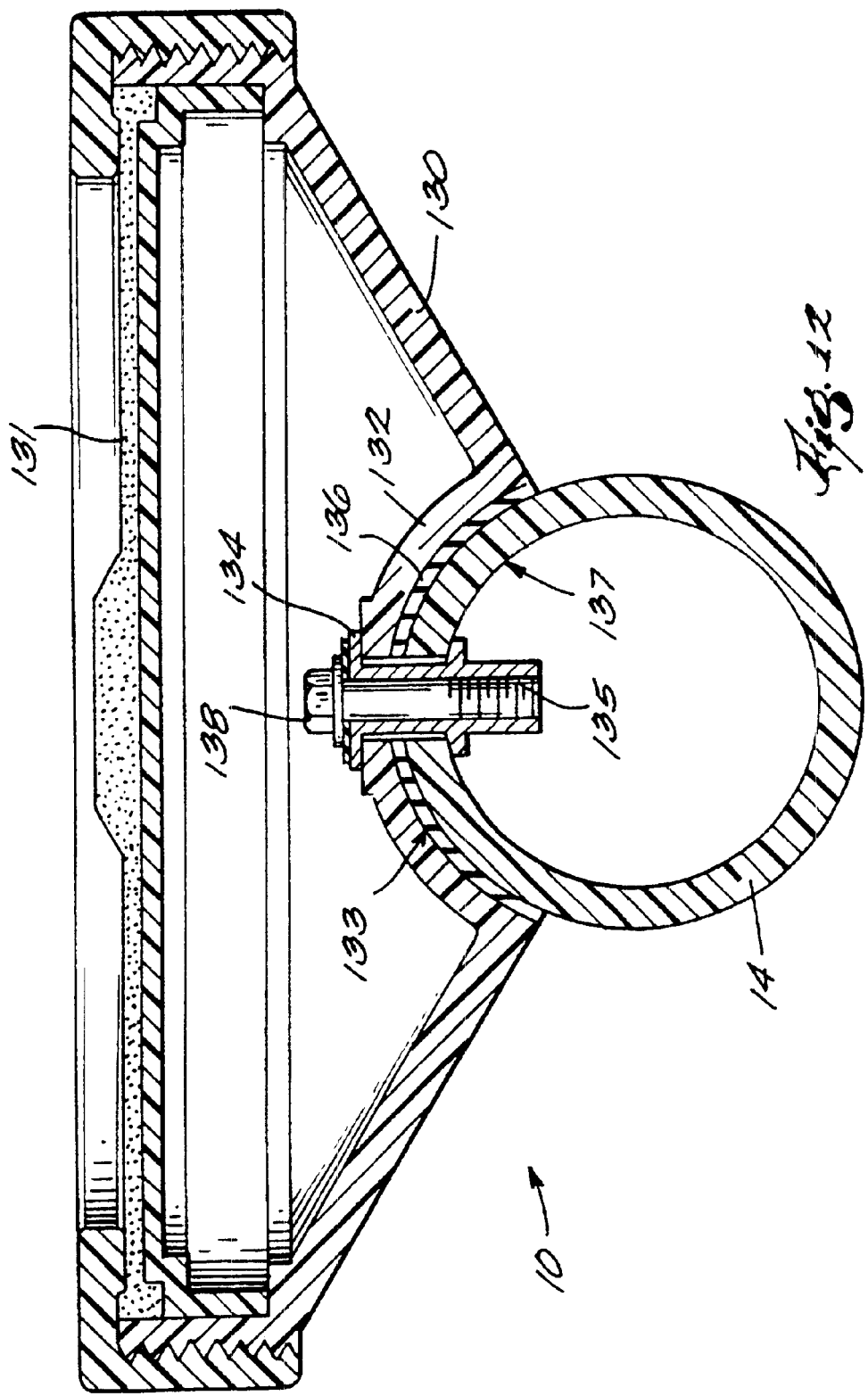

DIFFUSER ASSEMBLY

FIELD OF THE INVENTION

This invention relates to a diffuser assembly, and more particularly to a diffuser assembly for use in aerating wastewater within a wastewater treatment tank.

BACKGROUND OF THE INVENTION

Diffusers are used in wastewater treatment tanks to introduce oxygen into the wastewater. The wastewater is typically contained in treatment tanks, and air is forced through diffusers to produce fine bubbles that flow through the wastewater. Diffusing a high volume of air or oxygen into the wastewater in the form of fine bubbles facilitates biological growth during the waste treatment process. Supplying air into the treatment tank also serves to prevent sedimentation of the wastewater within the treatment tank. The treatment tank usually includes a network of air distribution piping for transferring air to the diffusers. The network of air distribution piping typically includes a drop pipe extending from an air supply to a manifold that is submerged within the wastewater. The submerged manifold is connected to a plurality of submerged distribution pipes that are also submerged within the wastewater and generally arranged in a parallel configuration along the bottom of the treatment tank. Each distribution pipe typically supports a number of diffusers such that the diffusers are also submerged within the wastewater along the bottom of the tank.

After a period of operation diffusers may become clogged and less efficient such that the diffusers must be cleaned and/or replaced. Cleaning and/or replacing the diffusers is burdensome because the treatment tank must be emptied to perform maintenance on the diffusers.

Conventional diffusers are connected either directly, or mounted via a base plate, to one of the air distribution pipes. The diffusers, or base plates, are typically mounted either to the distribution pipe by using conventional bolts or by welding. The construction of the diffuser assemblies makes it difficult to perform maintenance on the diffuser assembly. First, the distribution pipe may require machining in order for the diffuser assembly to be mounted thereto. Second, the diffuser assembly may be damaged when torque is applied to the diffuser assembly as the diffuser assembly is being assembled/disassembled. Applying a torque can be especially problematic because diffuser assemblies are usually attached at a single central location and have a limited ability to withstand excessive torque. Finally, common diffuser assemblies are often mounted either underneath or on the sides of the distribution pipe making it more difficult for an individual to access critical portions of the diffuser assembly during maintenance.

A typical diffuser arrangement is disclosed in U.S. Pat. No. 3,083,953. The gas diffusion apparatus includes two diffusers that are located laterally adjacent to a conduit portion. The conduit portion is mounted end-to-end within an air distribution pipe such that some of the air passes through the conduit portion.

Another diffuser is disclosed in U.S. Pat. No. 3,396,950. This patent discloses a diffuser for sewage treatment. The diffuser includes external threads that are used to mount the diffuser to the top of an air distribution pipe.

Another known diffuser is disclosed in U.S. Pat. No. 3,954,922. This patent discloses a diffuser having a header that is mounted underneath a distribution pipe. The header is mounted to the distribution pipe by a hose-type clamp. The header includes an opening that supplies air into a medium through a pair of angular flanges. The flanges extend from underneath the distribution pipe on opposite sides of the distribution pipe.

Another such diffuser is disclosed in U.S. Pat. No. 4,046,845. The disclosed diffuser is secured into the top of an air supply pipe through a base member that has an externally threaded section.

SUMMARY OF THE INVENTION

The present invention is directed to a diffuser assembly used for aerating a liquid. The diffuser assembly provides an improved design for attaching the diffuser assembly to an air distribution pipe. A plurality of these diffuser assemblies are able to aerate a large quantity of the medium when the medium is contained within one or more storage tanks. One example of a fluid that could be aerated is wastewater located in a sewage treatment facility.

The diffuser assembly preferably includes a first diffuser body and a second diffuser body. Both of the diffuser bodies are mounted in fluid communication with an air distribution pipe. A first diffusion media is supported by the first diffuser body and a second diffusion media is supported by the second diffuser body. The diffuser assembly further includes a saddle that supports the first and second diffuser bodies. The saddle is secured to the distribution pipe by a hollow core rivet having internal threads.

During operation of the diffuser assembly air under pressure is forced from the distribution pipe through the hollow core rivet into the diffuser assembly. The air enters the first and second diffuser bodies where the air flows through the first and second diffusion media before passing into the fluid to be aerated. As the air passes through the first and second it is formed into fine bubbles and the flow of fine bubbles of air through the fluid facilitates aeration of the fluid.

The saddle is preferably integral with the first and second diffuser bodies and includes a contoured surface that matches the upper half of the outer surface on the distribution pipe. The saddle of the diffuser assembly extends across the top of the distribution pipe and downwardly along both sides of the distribution pipe approximately to the midportion, or widest portion, of the pipe. Thus, the saddle surrounds the entire upper half of the pipe. This configuration provides a large contact area between the saddle and the distribution pipe.

In a preferred form of the invention the first diffuser body and the second diffuser body extend outwardly, transversely and upwardly from the distribution pipe. Positioning the diffuser bodies substantially above and away from the distribution pipe provides easy access to the diffuser assembly during service and eliminates interference from the distribution pipe with the fine bubbles that are emitted as the air passes through the diffusion media into the fluid to be aerated.

In another form of the invention the diffuser assembly includes a single diffuser body. The single diffuser body is mounted in fluid communication with the air distribution pipe. The diffuser body supports a single diffusion media. The diffuser assembly further includes a saddle that supports the diffuser body. The saddle is secured to the distribution pipe by a hollow core rivet.

In another aspect, the present invention relates to a system for aerating wastewater that comprises an air distribution pipe and a plurality of diffuser assemblies mounted along the air distribution pipe. The diffuser assemblies are adapted to receive air from one or more openings in air distribution pipe.

An object of this invention is to provide a diffuser assembly that is readily mounted onto a distribution pipe. Providing a diffuser assembly that is readily mounted to the distribution pipe minimizes the cost associated with installing, cleaning and/or replacing the diffuser assembly.

Another object of this invention is to provide a diffuser assembly that is capable of being securely connected to a distribution pipe that provides air to the diffuser assembly. A secure connection between the diffuser assembly and the distribution pipe reduces the possibility of damage that may arise when a force, or torque, is applied to the diffuser assembly during maintenance or installation.

Another objective is to provide a diffuser assembly that can be mounted anywhere along the length of a distribution pipe. Increasing the flexibility associated with mounting the diffuser assembly to the distribution pipe simplifies the task of mounting numerous diffuser assemblies along the length of a distribution pipe that is submerged in a treatment tank.

Still another object of the invention is to provide a diffuser assembly that is readily mounted to existing air distribution pipes such that the network of distribution pipes within an existing storage tank can be retrofitted with new diffuser assemblies.

Other features and advantages of the invention will become apparent to those skilled in the art upon review of the following detailed description, claims and drawings.

BRIEF DESCRIPTION OF THE DRAWING

FIG. 1 is an enlarged top plan view of a single dual diffuser assembly mounted on a distribution pipe.

FIG. 2 is a top plan view of a number of dual diffuser assemblies mounted along a single distribution pipe.

FIG. 3 is a perspective view showing a number of dual diffuser assemblies mounted along a section of a single distribution pipe.

FIG. 4 is a section view of the dual diffuser assembly of FIG. 2 without the hollow core rivet taken through the line 4—4.

FIG. 6 is a perspective view of another embodiment of the dual diffuser assembly.

FIG. 7 is a section view, similar to FIG. 5, wherein one of the diffusers is enlarged even further to illustrate the structure of the riveted connection between the distribution pipe and the saddle in greater detail.

FIG. 12 is a section view, similar to FIG. 4, illustrating another form of the diffuser assembly.

DETAILED DESCRIPTION OF THE PREFERRED EMBODIMENT

FIG. 1 illustrates a top plan view of a dual diffuser assembly 10 of the present invention mounted to a distribution pipe 14. FIG. 2 shows several dual diffuser assemblies 10 mounted to a distribution pipe 14. Mounting several diffuser assemblies 10 along the distribution pipe 14 increases the volume of air that can be diffused into a fluid to be aerated.

Figure 5:
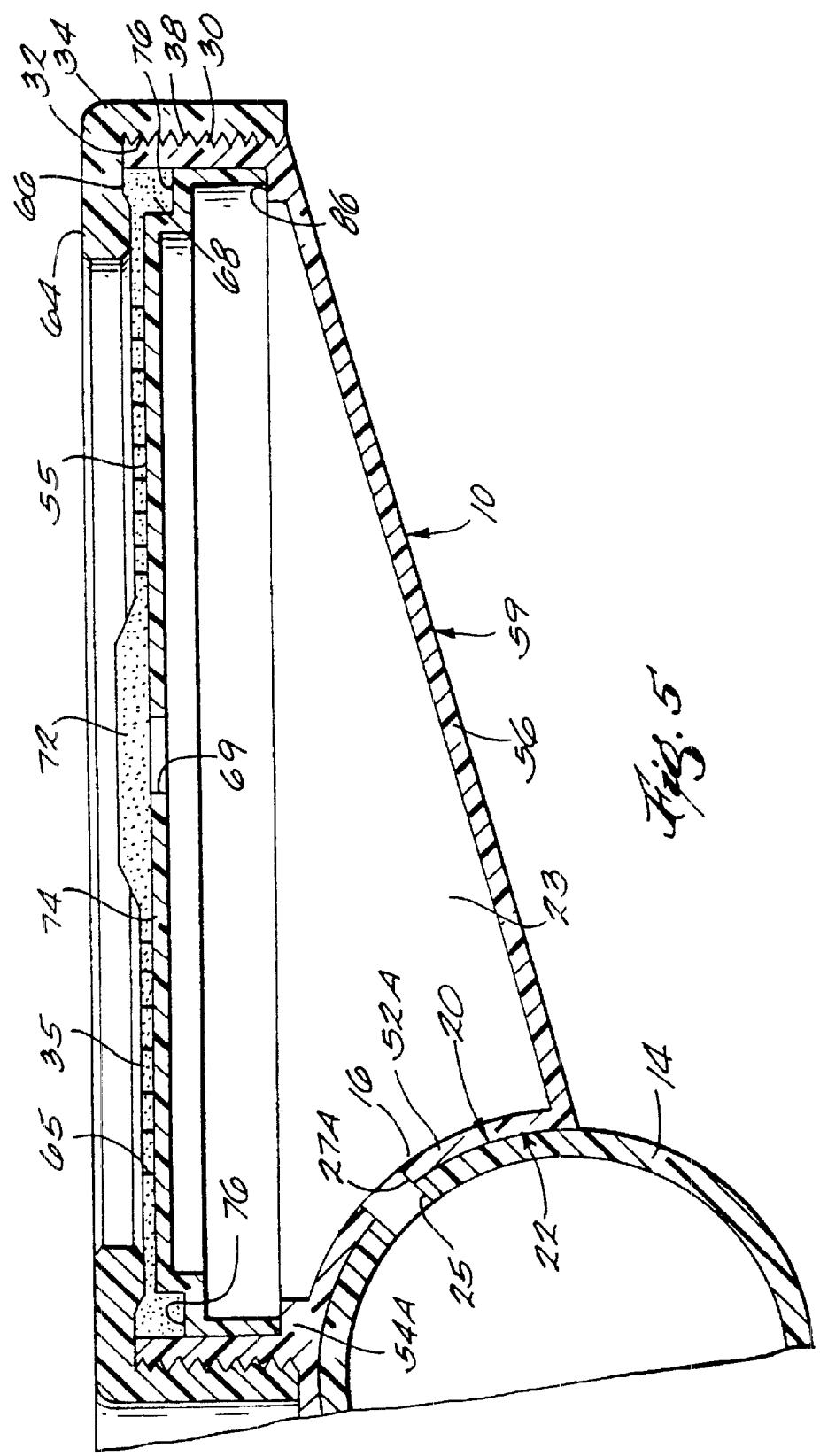
FIG. 5 is a section view, similar to FIG. 4, wherein one of the diffusers is enlarged to illustrate the structure of the dual diffuser assembly in greater detail.

As best illustrated in FIGS. 3–5, the diffuser assembly 10 includes a first diffuser body 23 and a second diffuser body 24. Both of the diffuser bodies 23,24 are mounted in fluid communication with an air distribution pipe 14. The first diffuser body 23 supports a first diffusion media 35 and a second diffuser body 24 supports a second diffusion media 36. The dual diffuser assembly 10 further includes a saddle 16 that connects the first and second diffuser bodies 23,24 to the distribution pipe 14. The saddle 16 is preferably integral with the first and second diffuser bodies 23,24 and includes a contoured surface 20 that matches the upper half of the outer surface on the distribution pipe 14. In addition, the saddle 16 of the diffuser assembly 10 extends across the top of the distribution pipe 14 and downwardly along both sides of the distribution pipe 14 approximately to the mid-portion, or widest portion, of the distribution pipe 14. Thus, the saddle 16 preferably surrounds the entire upper half of the distribution pipe 14. As illustrated in FIGS. 3–5, the first diffuser body 23 and the second diffuser body 24 preferably extend outwardly, transversely and upwardly from the distribution pipe 14.

During operation of the diffuser assembly 10, air under pressure flows into the first diffuser body 23 and the second diffuser body 24 through one or more hollow core rivets 90 (only one is shown in FIG. 7). The air flowing into the first diffuser body 23 exits the first diffuser body 23 through a first diffusion media 35 into the fluid to be aerated. Similarly, the air flowing into the second diffuser body 24 exits the second diffuser body 24 through a second diffusion media 36. As the air passes through the first diffusion media 35 and the second diffusion media 36, the air is transformed into fine bubbles that aerate the medium. Although the diffusers could be positioned in other orientations, the first diffusion media 35 and the second diffusion media 36 are preferably oriented horizontally such that the diffused air flows into the medium in a substantially vertical orientation. The first diffusion media 35 and the second diffusion media 36 are preferably flexible membranes as more clearly defined in U.S. Pat. Nos. 3,997,634 and 5,530,688, which are incorporated herein by reference, although ceramic diffusion media that are commonly known in the art may also be used.

In the embodiment illustrated in FIGS. 1–5, the contoured surface 20 of the saddle 16 is semi-cylindrical in order to facilitate fitting existing distribution pipes with the diffuser assembly 10. The contoured surface 20 provides a greater contact area between the distribution pipe 14 and the diffuser assembly 10.

Referring now particularly to FIG. 7, the diffuser assembly 10 is attached to the distribution pipe 14 by using one or more hollow core rivets 90 (only one is shown in FIG. 7). A hollow core rivet 90 extends through the openings 27A, 27B in the distribution pipe 14 and the first and second openings 25, 26 in the diffuser assembly 10. The hollow core rivet 90 provides an air flow path 91 from the distribution pipe 14 into the diffuser assembly 10 and prevents any of the air from leaking between distribution pipe 14 and the diffuser assembly 10. The hollow core rivet 90 is staked over the inside surface 92 of the distribution pipe 14 at one end and the interior surface 93 of the thin walled section 52A on the other end.

Figure 8:
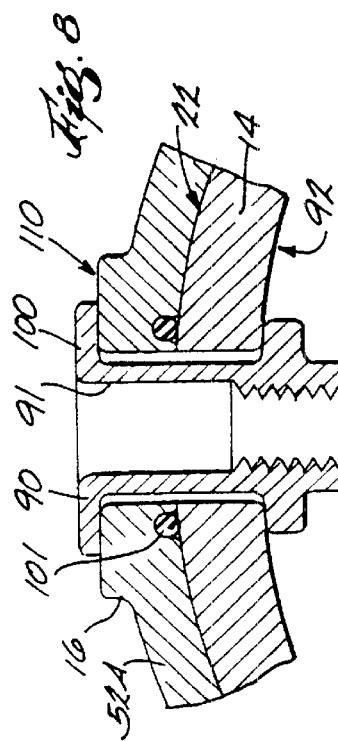
FIG. 8 is a section view, similar to FIG. 7, illustrating another form of the riveted connection between the distribution pipe and the saddle.
Figure 9:
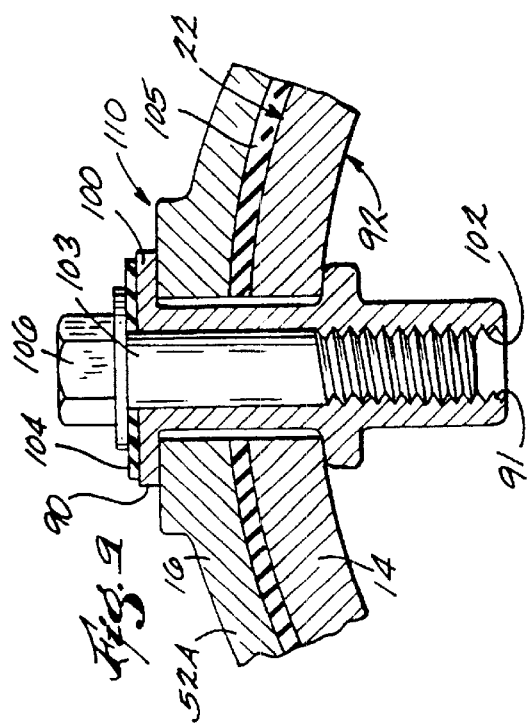
FIG. 9 is a section view, similar to FIG. 7, illustrating another form of the riveted connection between the distribution pipe and the saddle.

FIGS. 8–9 illustrate another form of the hollow core rivet 90. The hollow core rivet 90 includes a head 100 that is compressed against a flat surface 110 on the thin walled section 52A of the saddle 16 when the hollow core rivet 90 is staked over the inside surface 92 of the distribution pipe 14. The hollow core rivet 90 is staked at about the midpoint of the hollow core rivet 90 such that the hollow core rivet 90 extends into the distribution pipe 14. The airflow path 91 in the hollow core rivet 90 includes an internally threaded portion 102. The internal threads 102 permit a bolt 103, or plug, to be screwed into the hollow core rivet 90 in order to plug the air flow path 91. The aeration capacity of a system of diffuser assemblies can be adjusted by threading a bolt, or plug, into the internal threads thereby preventing air from flowing from the distribution pipe into the diffuser assemblies that include bolts or plugs.

In the embodiment illustrated in FIG. 8, the thin walled section 52A of the saddle 16 includes a notch that is adapted to receive an O-ring seal 101. The O-ring seal 101 is compressed between the saddle 16 and the distribution pipe 14. It should be understood that the notch could be in the outer surface 22 of the distribution pipe 14.

Referring now particularly to FIG. 9, a rubber washer 104 is preferably secured between the head 106 of the bolt 103 and the head 100 of the hollow core rivet 90. FIG. 9 also shows using a rubber gasket 105 to provide the seal between the distribution pipe 14 and the saddle 16.

Figure 10:
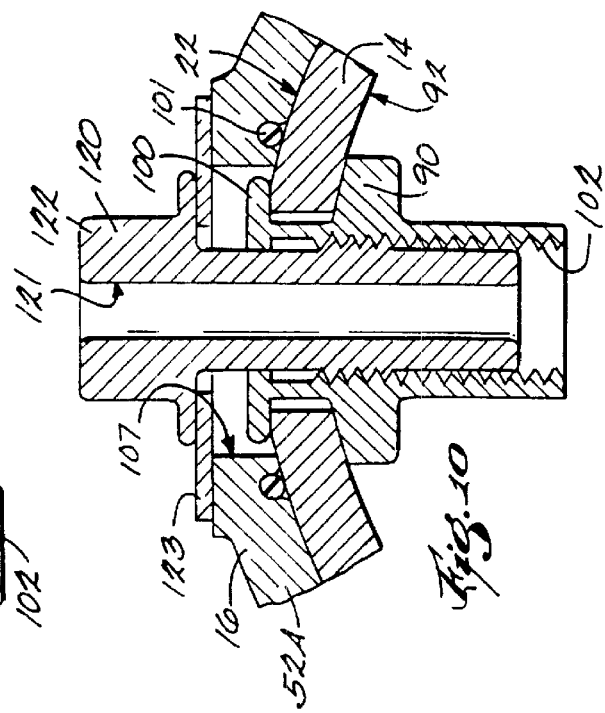
FIG. 10 is a section view, similar to FIG. 7, illustrating another form of the riveted connection between the distribution pipe and the saddle.
Figure 11:
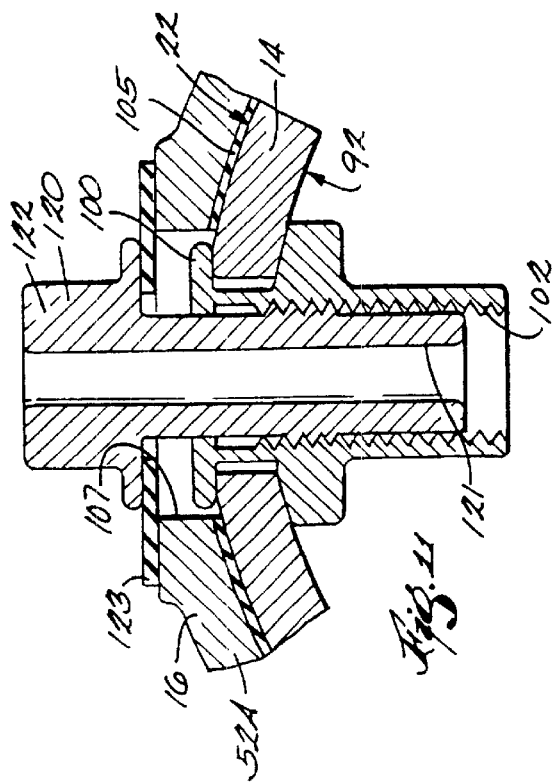
FIG. 11 is a section view, similar to FIG. 7, illustrating another form of the riveted connection between the distribution pipe and the saddle.

FIGS. 10–11 illustrate another form of the rivet used to connect the saddle 16 to the distribution pipe 14. In this form, the head 100 of the hollow core rivet 90 is secured within an enlarged opening 107 in the thin walled section 52A of the saddle 16 such that the head 100 is compressed against the outside surface 22 of the distribution pipe 14. A bolt 120 having an axially extending orifice 121 is screwed into the internal threads 102 in the hollow core rivet 90. Air flows from the distribution pipe 14 into the diffuser assembly 10 through the orifice 121. The bolt 120 includes a head 122 that compresses a washer 123 against the thin walled section 52A of the saddle 16. This form of the invention permits simplified field assembly of the saddle 16 to the distribution pipe 14.

The diffuser assembly 10 can be mounted to a heavy gauge plastic distribution pipe or even a metal distribution pipe. The design of the diffuser assembly 10 also permits it to be mounted at any position along the length of the distribution pipe 14, merely by drilling holes in the distribution pipe 14 at selected locations.

In another form of the invention, the saddle 16 includes a main connecting section 50 that connects thin walled sections 52A,52B that are adapted to be positioned on substantially opposite lateral sides of the distribution pipe 14. The main connecting portion 50 includes a pair of thicker sections 54A,54B that are adapted to be positioned near the top of the distribution pipe 14 on opposite sides. The thin walled sections 52A,52B are preferably integral with thicker sections 54A,54B. Each thin walled section 52A,52B includes an opening 27A,27B that is aligned with the openings 25,26 in the distribution pipe 14. The openings 27A,27B also match the size and shape of the first opening 25 and the second opening 26.

As best shown in FIG. 5, the upper portions of the first diffuser body 23 and the second diffuser body 24 (not shown in FIG. 5) each include a circular wall 30 having external threads 32 that are adapted to engage with corresponding internal threads 38 on a retaining ring 34. The first diffuser membrane 35 is secured in place as the retaining ring 34 is screwed onto the circular wall 30. A portion of the circular wall 30 is preferably integral with the thicker section 54A such that the circular wall 30 extends substantially vertically upwardly from the thicker section 54A.

As shown most clearly in FIG. 3, the remainder of the circular wall 30 is integral with a lower wall 56 on the first diffuser body 23. The lower wall 56 includes a bottom surface 59 that is contiguous with that portion of the bottom of the circular wall 30 that is not integral with the thicker section 54A of the saddle 16. The bottom surface 59 of the lower wall 56 is rounded, and extends upwardly and transversely from the lateral midpoint of the distribution pipe 14. The second diffuser body 24 has a similar lower wall 57 (see FIG. 4). Locating the circular walls 30 in this manner positions the diffusers 35,36 outwardly, upwardly and transversely from the distribution pipe 14. The bottom wall 56 of the first diffuser body 23 is integral with the thin walled section 52A of the saddle 16, and the bottom wall 57 of the second diffuser body 24 is integral with the thin walled section 52B of the saddle 16.

In another form of the invention the peripheral edge of the diffusers may include an upwardly extending annular rib 66 and a downwardly projecting annular rib 68. The downwardly extending rib 68 is positioned over a support plate 55 contained within each diffuser body. The upwardly extending rib 66 provides structural stability to each diffuser by bearing against the retaining ring 34 when retaining rings 34 are used to secure the diffusers within the diffuser bodies. The support plate 55 comprises a slightly domed support member 74 having an L-shaped peripheral shoulder 76 that receives the downwardly extending annular rib 68 on the diffuser. The support member 74 includes an opening 69 that the air passes through before exiting through the diffusers into the medium. In the illustrated form of the invention the first diffuser body 23 and the second diffuser body 24 include an annular shoulder 86 upon which the support plate 55 rests. As disclosed in earlier diffuser designs, a thicker, upraised portion 72 may be provided to give additional structural stability to the diffusers. In addition, the diffuser may include a plurality of slots 65 arranged as a series of concentric circles.

Another embodiment of the present invention is shown in FIG. 6. In this embodiment, the saddle 16 further includes a clamping member 18 which extends around the bottom surface of the distribution pipe. The clamping member 18 is adapted to secure the saddle 16 to the distribution pipe 14. The clamping member 18 is preferably contiguous with the bottom surface of the distribution pipe 14 and is secured to the saddle 16 by any conventional means including, but not limited to, the fastener 19. This embodiment may also include one or more O-rings (not shown) that are compressed between the diffuser assembly 10 and the distribution pipe 14. The openings in the O-rings match the openings the diffuser assembly 10 and the distribution pipe 14 such that air flows from the distribution pipe 14 into the diffuser assembly 10 through the O-rings. The O-rings act as a seal and prevent any air from escaping between the diffuser assembly 10 and the distribution pipe 14. The openings in the diffuser assembly 10 and/or the distribution pipe 14 may be recessed such that the O-rings fit within the recesses. Recessing the openings permits the saddle 16 to be in surface contact with the distribution pipe 14 when O-rings are used.

Another form of the diffuser assembly 10 is illustrated in FIG. 12. In this form, the diffuser assembly 10 includes a diffuser body 130 mounted in fluid communication with the air distribution pipe 14. The diffuser body 130 supports a diffusion media 131 and includes a saddle 132 that connects the diffuser assembly 10 to the distribution pipe 14. The saddle 132 is preferably integral with the diffuser body 130 and includes a contoured surface 133 that matches the upper third of the outer surface on the distribution pipe 14. The diffuser body 130 extends upwardly from the distribution pipe 14.

The saddle 132 of the diffuser assembly 10 is attached to the distribution pipe 14 by using a hollow core rivet 134. The hollow core rivet 134 extends through aligned openings in the distribution pipe 14 and the saddle 132. The hollow core rivet 134 is staked over an inside surface 137 of the distribution pipe 14 and provides an air flow path 135 from the distribution pipe 14 into the diffuser assembly 10. The hollow core rivet 134 works in conjunction with gasket 136 to prevent air from leaking between the distribution pipe 14 and the saddle 132. The air flow path 135 is defined by internal threads in the hollow core rivet 134. A bolt 138 is shown screwed into the hollow core rivet 134 in order to plug the air flow path 135.

The foregoing description of the present invention has been presented for purposes of illustration and description. Furthermore, the description is not intended to limit the invention to the form disclosed herein. Consequently, variances and modifications commensurate with the above teachings, and the skill or knowledge of the relevant art, are within the scope of the present invention. The embodiments described herein are intended to explain the best mode for practicing the invention and to enable others skilled in the art to utilize the invention in such, or other, embodiments and with various modifications required by the particular applications or uses of the present invention. It is intended that the appended claims be construed to included alternative embodiments to the extent permitted by the prior art.

What is claimed is:

1. A diffuser assembly for diffusing a gas received from a distribution pipe into a fluid in order to aerate the fluid, said diffuser assembly comprising:
   a first diffuser body in fluid communication with the distribution pipe;
   a second diffuser body in fluid communication with the distribution pipe;
   a first diffusion media supported by said first diffuser body such that the gas flows from the distribution pipe into said first diffuser body and through said first diffusion media into the fluid;
   a second diffusion media supported by said second diffuser body such that the gas flows from the distribution pipe into said second diffuser body and through said second diffusion media into the fluid;
   a saddle supporting said first diffuser body and said second diffuser body; and
   a first hollow core rivet connecting said saddle to the distribution pipe such that the gas flows from the distribution pipe through said first hollow core rivet into said first diffuser body and said second diffuser body.

2. The diffuser assembly according to claim 1 wherein said first hollow core rivet includes internal threads.

3. The diffuser assembly according to claim 2 further comprising a plug screwed into said internal threads of said hollow core rivet to prevent the gas from flowing from the distribution pipe into the diffuser assembly.

4. The diffuser assembly according to claim 1 wherein said saddle includes an interior surface and the distribution pipe includes an inside surface, said hollow core rivet including a head compressed against said interior surface of said saddle when said hollow core rivet is staked against the inside surface of the distribution pipe.

5. The diffuser assembly according to claim 4 wherein said interior surface of said saddle includes a substantially flat portion and said head of said hollow core rivet is pressed against said flat portion.

6. The diffuser assembly according to claim 1 further comprising a second hollow core rivet connecting said saddle to the distribution pipe such that the gas flows from said distribution pipe through said first hollow core rivet into said first diffuser body and through said second hollow core rivet into said second diffuser body.

7. The diffuser assembly according to claim 6 wherein said first hollow core rivet and said second hollow core rivet each include internal threads.

8. The diffuser assembly according to claim 7 further comprising a first bolt screwed into said internal threads of said first hollow core rivet and a second bolt screwed into said internal threads of said second hollow core rivet, said first bolt and said second bolt preventing the gas from passing between the distribution pipe and the diffuser assembly.

9. The diffuser assembly according to claim 1 wherein said saddle is integral with said first diffuser body and said second diffuser body.

10. A system for aerating wastewater comprising:
    an air distribution pipe for supplying air,
    a plurality of diffuser assemblies adapted to diffuse air received from said distribution pipe into the wastewater, each of said diffuser assemblies is mounted along said air distribution pipe and includes,
      a first diffuser body in fluid communication with said distribution pipe;
      a second diffuser body in fluid communication with said distribution pipe;
      a first diffusion media supported by said first diffuser body;
      a second diffusion media supported by said second diffuser body;
      a saddle supporting said first diffuser body and said second diffuser body; and
      a first hollow core rivet connecting said saddle to said distribution pipe such that air flows from said distribution pipe through said first hollow core rivet into said first diffuser body and said second diffuser body.

11. The system according to claim 10 wherein said saddle is integral with said first diffuser body and said second diffuser body.

12. The system according to claim 10 wherein said first hollow core rivet includes internal threads.

13. The system according to claim 10 wherein said saddle includes an interior surface and the distribution pipe includes an inside surface, said hollow core rivet including a head compressed against said interior surface of said saddle when said hollow core rivet is staked against said inside surface of the distribution pipe.

14. The system according to claim 13 wherein said interior surface of said saddle includes a substantially flat portion and said head of said hollow core rivet is pressed against said flat portion.

15. The system according to claim 10 further comprising a second hollow core rivet connecting said saddle to the distribution pipe such that air flows from said distribution pipe through said first hollow core rivet into said first diffuser body and through said second hollow core rivet into said second diffuser body.

16. The system according to claim 15 wherein said first hollow core rivet and said second hollow core rivet each include internal threads.

17. A system for aerating wastewater comprising:

an air distribution pipe for supplying air, a plurality of diffuser assemblies adapted to diffuse air received from said distribution pipe into the wastewater, each of said diffuser assemblies is mounted along said air distribution pipe and includes,
- a diffuser body in fluid communication with said distribution pipe;
- a diffusion media supported by said diffuser body;
- a saddle supporting said diffuser body; and a hollow core rivet connecting said saddle to said distribution pipe such that air flows from said distribution pipe through said hollow core rivet into said diffuser body.

18. The system according to claim 17 wherein said saddle is integral with said diffuser body.

19. The system according to claim 17 wherein said hollow core rivet includes internal threads.

20. The system according to claim 17 wherein said saddle includes an interior surface and the distribution pipe includes an inside surface, said hollow core rivet including a head compressed against said interior surface of said saddle when said hollow core rivet is staked against said inside surface of the distribution pipe.

21. The system according to claim 20 wherein said interior surface of said saddle includes a substantially flat portion and said head of said hollow core rivet is pressed against said flat portion.

22. A system for aerating wastewater comprising:

an air distribution pipe for supplying air, a plurality of diffuser assemblies adapted to diffuse air received from said distribution pipe into the wastewater, each said diffuser assembly is mounted along said air distribution pipe and includes,
- a first diffuser body in fluid communication with said distribution pipe;
- a second diffuser body in fluid communication with said distribution pipe;
- a first diffusion media supported by said first diffuser body;
- a second diffusion media supported by said second diffuser body;
- a saddle supporting said first diffuser body and said second diffuser body;
- a first hollow core rivet having internal threads, said first hollow core rivet including a head compressed against an outside surface of said distribution pipe when said first hollow core rivet is staked against an inside surface of said distribution pipe, and
- a hollow core bolt connecting said saddle to said distribution pipe such that air flows from said distribution pipe through said first hollow core bolt into said first diffuser body and said second diffuser body.

23. The system according to claim 22 wherein said saddle includes an interior surface and said hollow core bolt includes a head compressed against said interior surface of said saddle when said hollow core bolt is screwed into said internal threads of said first hollow core rivet.

24. The system according to claim 23 wherein said interior surface of said saddle includes a substantially flat portion and said head of said hollow core bolt is pressed against said flat portion.

25. The system according to claim 23 further comprising a second hollow core rivet connected to said distribution pipe and a second hollow core bolt connecting said saddle to said distribution pipe such that air flows from said distribution pipe through said first hollow core bolt into said first diffuser body and through said second hollow core bolt into said second diffuser body.

26. A diffuser assembly for diffusing a gas received from a distribution pipe into a fluid in order to aerate the fluid, said diffuser assembly comprising:
- a diffuser body in fluid communication with the distribution pipe;
- a diffusion media supported by said diffuser body such that the gas flows from the distribution pipe into said diffuser body and through said diffusion media into the fluid;
- a hollow core rivet connecting said diffuser body to the distribution pipe such that the gas flows from the distribution pipe through said hollow core rivet into said diffuser body.

* * * * *